C. MARES.
PIPE ELBOW.
APPLICATION FILED FEB. 28, 1910.
997,072.
Patented July 4, 1911.
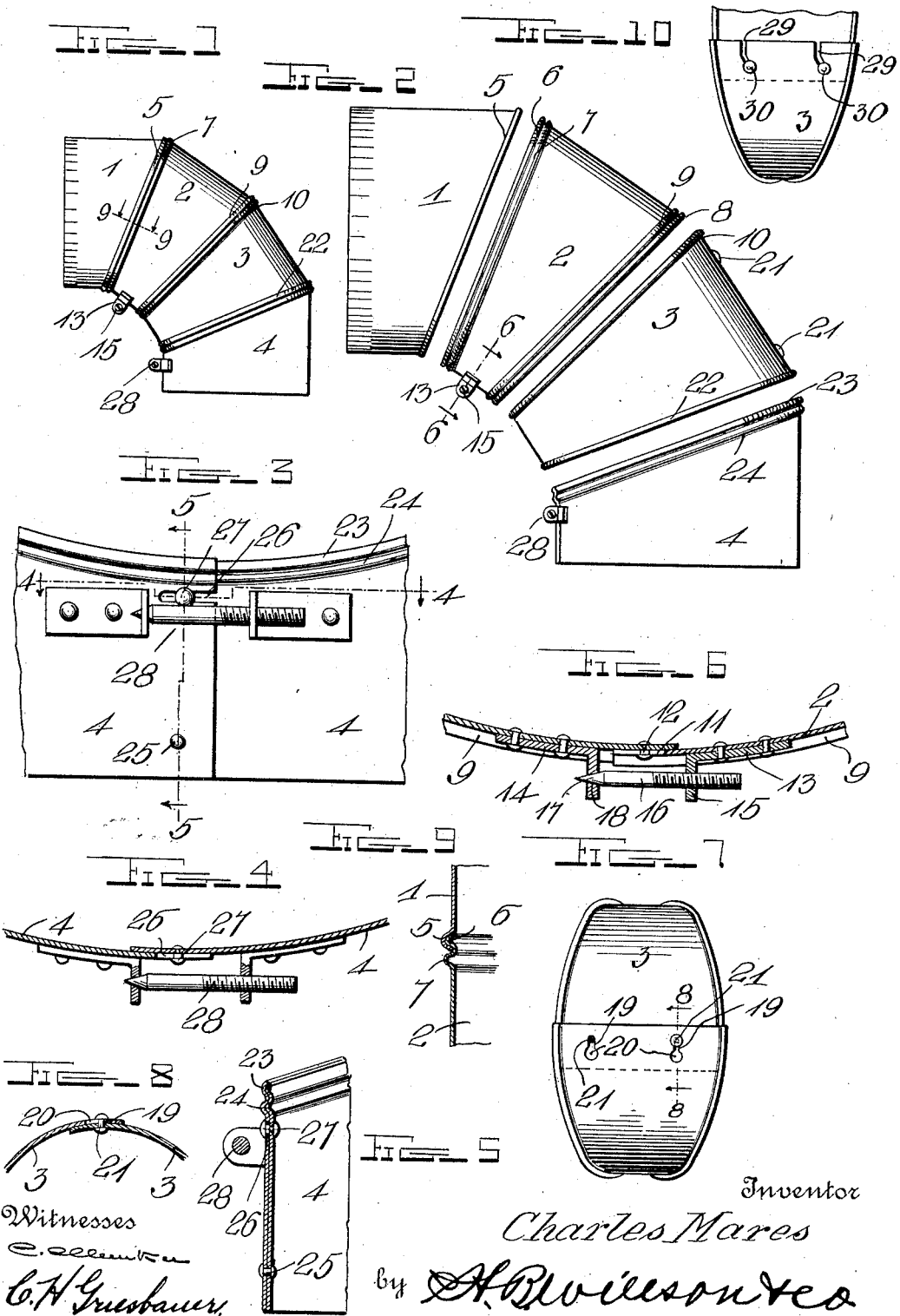
Witnesses
C. H. Giesbauer
Inventor
Charles Mares
by H. B. Willson & Co.
Attorneys

UNITED STATES PATENT OFFICE.

CHARLES MARES, OF WHEATON, ILLINOIS.

PIPE-ELBOW.

997,072.  Specification of Letters Patent.  Patented July 4, 1911.

Application filed February 28, 1910. Serial No. 546,473.

*To all whom it may concern:*

Be it known that I, CHARLES MARES, a citizen of the United States, residing at Wheaton, in the county of Dupage and State of Illinois, have invented certain new and useful Improvements in Pipe-Elbows; and I do declare the following to be a full, clear, and exact description of the invention, such as will enable others skilled in the art to which it appertains to make and use the same.

This invention relates to improvements in elbows for stove pipes, ventilating pipes and the like.

One object of the invention is to provide an elbow formed in detachably connected sections which, when separated, are adapted to be nested together, thereby reducing the elbow to a small, compact form for shipping or storing.

Another object is to provide reliable means for securing the sections together to form the elbow.

With the foregoing and other objects in view, the invention consists of certain novel features of construction, combination and arrangement of parts as will be more fully described and particularly pointed out in the appended claim.

In the accompanying drawings, Figure 1 is a side view of an elbow constructed in accordance with the invention; Fig. 2 is a similar view showing the sections disengaged and slightly separated; Fig. 3 is a detail fragmentary view of one of the end sections of the elbow showing the pivoted adjustable connection of the ends of the metal forming the section, and the means for expanding the inner end of the section into locking engagement with the end of the adjoining section; Fig. 4 is a horizontal section on the line 4—4 of Fig. 3; Fig. 5 is a vertical section on the line 5—5 of Fig. 3; Fig. 6 is an enlarged sectional view on the line 6—6 of Fig. 2 showing the adjustable connection for this section of the elbow; Fig. 7 is a fragmentary view showing the outer side of one of the intermediate sections and illustrating the manner in which the overlapping ends of the metal are locked together to form the section; Fig. 8 is a detail sectional view on the line 8—8 of Fig. 7; Fig. 9 is an enlarged sectional view on the line 9—9 of Fig. 1 showing the interlocking connection between the sections of the elbow; Fig. 10 is a fragmentary view of the section shown in Fig. 7, illustrating a modified form of the locking connection between the ends of the metal.

My improved elbow, as shown in the accompanying drawings, consists of four sections numbered respectively 1, 2, 3 and 4, said sections being adapted to be detachably secured together and are of such shape that when connected they form a perfect elbow. The section 1, which is here shown as the upper section of the elbow, has its inner end formed at an angle as shown and on said angular end is formed an outwardly projecting annular bead 5, which provides a groove on its inner face with which is adapted to be engaged an annular bead 6 formed on the adjoining angular end of the next section 2 of the elbow. On said end of the section 2 adjacent to the bead 6 is formed a second annular bead 7, said bead forming a positive stop for the inner end of the section 1 when the bead 6 is engaged with the groove in said end of the section 1. On the opposite angular end of the section 2 are formed an outer connecting bead 8 and an inner stop bead 9 corresponding to the beads 6 and 7 on the other end of said section, said bead 8 being adapted to be engaged with a groove formed by a bead 10 on the adjoining angular end of the section 3 of the elbow, whereby said sections are joined together in the same manner as the sections 1 and 2 which provides for throwing of one section on the other to vary the angle of the elbow.

In order to reduce the diameter of the section 2 sufficiently to permit the beaded ends thereof to be engaged with the grooves in the adjoining sections 1 and 3, the ends of the metal forming the section 2 at the inner side thereof overlap, as clearly shown in Fig. 6 of the drawings. The overlapping end of the metal has formed therein a guide notch 11, which is slidably engaged with a guide rivet 12, arranged in the underlapping end of the metal, whereby said ends of the metal, when pushed together or forced apart to contract or expand the section, will be guided and prevented from moving laterally on each other or, in other words, the notch and rivet will hold the overlapping ends of the metal in sliding engagement with each other. After the ends of the metal have been pushed together to contract or reduce the size of the section sufficiently to permit the beads on the opposite ends thereof to be engaged with the grooves in the ends of the adjoining sections, said ends are expanded to lock the beaded ends of the sections into engagement with their respective grooves by an expanding mechanism which is here shown and preferably consists of angle plates 13 and 14. The angular projecting end of the plate 13 has formed therein a threaded aperture 15, with which is engaged an expanding screw 16 having a pointed end 17, which fits or bears in a tapered aperture 18 formed in the angular projecting end of the plate 14. It will thus be seen that, as the plates 13 and 14 are secured to the opposite overlapping ends of the metal forming the section, when the screw 16 is turned in the proper direction, said ends of the metal will be forced apart, thus expanding or increasing the diameter of the section to cause the beaded outer ends thereof to tightly engage the grooves in the adjoining ends of the sections 1 and 3, so that said sections will be firmly held together in adjusted position and cannot be separated until the screw 16 is turned in the opposite direction or unscrewed to permit the overlapping ends of the section to be forced together. The ends of the section 3 are preferably overlapped and detachably connected together at its wider portion, as clearly shown in Fig. 7 of the drawings, and in the overlapping end of the metal are formed key-hole shaped apertures 19, the inner ends of which are enlarged as shown at 20, and when the ends of the metal are brought together, said apertures are adapted to be engaged with headed studs 21 arranged in the underlapping end of the metal. When the ends of the metal are brought together and the studs engaged with the apertures, the ends of the section will be locked together against the pressure of the beaded ends of the adjoining sections when the latter are expanded.

On the opposite end of the section 3 from the bead 10 is formed a bead 22, which provides an annular groove adapted to be engaged by a bead 23 on the adjacent angular end of the section 4 of the elbow, said section also being provided adjacent to the bead 23 with a stop bead 24 to limit the engagement between the ends of the sections 3 and 4. The ends of the metal forming the section 4 are overlapped on the inner side of the elbow at the narrow part of the section as clearly shown in Figs. 3, 4, and 5 of the drawings, and said overlapping ends of the metal are pivotally connected together adjacent to the outer end of the elbow by a pivoting rivet 25, and at the inner end of the section the overlapping end of the metal is provided with a guide notch 26, which is slidably engaged with a guide rivet 27 arranged in the underlapping end of the metal, as shown. By thus slidably connecting the overlapping ends of the metal at the inner end of the section, said end may be contracted or expanded to permit the engagement of the bead 23 with the groove in the adjoining end of the section 3, as hereinbefore described. In order to expand said inner end of the section 4 when the bead 23 thereon has been engaged with the groove in the adjoining section, I provide an expanding mechanism 28, the construction and operation of which is the same as shown and described in connection with the adjustable ends of the section 2 and therefore does not require further explanation.

By detachably connecting the sections of the elbow together, as herein shown and described, it will be seen that the sections may be readily separated and that by contracting certain of the separated sections and expanding others, said sections may be nested together in a compact form, whereby the packing of the elbow for shipping or storing purposes is greatly facilitated. By turning one or more of the sections, an elbow of any desired angle from 0° to 90° may be formed, thus greatly increasing the usefulness and value of the elbow.

In Fig. 10 of the drawing is shown a slightly modified form of the means for locking the ends of the metal together in the section 3 of the elbow. In this instance, the overlapping end of the metal is provided with notches 29, the inner ends of which are turned at an angle as shown so that when engaged with rivets 30, the ends of the metal will be drawn together and secured, as shown.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

Having thus described my invention, what I claim is:—

An elbow of the class described comprising end sections, each having one straight end and the other obliquely inclined, one of said sections being split, an expanding device carried by the last named section at its split portion, intermediate sections arranged between said end sections, each having its opposite ends obliquely inclined in opposite directions to form narrow and wide portions respectively, inter-engaging means on the adjacent ends of said sections, one of said intermediate sections being split transversely at its broad portion and the ends thereby formed detachably connected, and the other intermediate section being split transversely at its narrow portion, and an expanding device carried by the last-named intermediate section at its split portion whereby the alternate sections are expanded causing the various sections to be locked together.

In testimony whereof I have hereunto set my hand in presence of two subscribing witnesses.

CHARLES MARES.

Witnesses:
E. G. SWANSON,
J. J. HOLUB.